(12) United States Patent
Stone (10) Patent No.: US 10,890,721 B2
(45) Date of Patent: Jan. 12, 2021

(54) METHOD OF ASSEMBLING A FIBRE CONNECTOR

(71) Applicant: Hexatronic Group AB, Gothenburg (SE)

(72) Inventor: Kieran Stone, Gothenburg (SE)

(73) Assignee: Hexatronic Group AB, Gothenburg (SE)

( * ) Notice: Subject to any disclaimer, the term of this patent is extended or adjusted under 35 U.S.C. 154(b) by 0 days.

(21) Appl. No.: 16/335,165

(22) PCT Filed: Sep. 21, 2017

(86) PCT No.: PCT/EP2017/073931
§ 371 (c)(1),
(2) Date: Mar. 20, 2019

(87) PCT Pub. No.: WO2018/055045
PCT Pub. Date: Mar. 29, 2018

(65) Prior Publication Data
US 2019/0278027 A1    Sep. 12, 2019

(30) Foreign Application Priority Data

Sep. 23, 2016 (EP) .................................... 16190263

(51) Int. Cl.
*G02B 6/38* (2006.01)
*G02B 6/44* (2006.01)

(52) U.S. Cl.
CPC ........... *G02B 6/387* (2013.01); *G02B 6/3825* (2013.01); *G02B 6/3851* (2013.01); *G02B 6/3869* (2013.01); *G02B 6/4465* (2013.01)

(58) Field of Classification Search
CPC ..... G02B 6/387; G02B 6/3825; G02B 6/3851
See application file for complete search history.

(56) References Cited

U.S. PATENT DOCUMENTS 4,762,389 A * 8/1988 Kaihara ............... G02B 6/3825
385/59
5,809,192 A   9/1998 Manning et al.
(Continued)

FOREIGN PATENT DOCUMENTS

EP    2012153 A1   1/2009
GB    2468442 A    9/2010
(Continued)

OTHER PUBLICATIONS

International Search Report for International Application No. PCT/EP2017/073931, dated Jan. 5, 2018, 3 pages.

*Primary Examiner* — Peter Radkowski
(74) *Attorney, Agent, or Firm* — Brake Hughes Bellermann LLP (57) ABSTRACT

A ferrule assembly comprises a ferrule mounted in an opening of a ferrule back body. The ferrule assembly is mounted at an end of an optical fibre extending through the ferrule along an axial direction. The ferrule assembly is passed through a tubular section and then through a biasing member. The back body is then inserted into an opening of a back body holder and attached to the back body holder. The back body holder prevents the ferrule assembly from passing back through the biasing member. The insertion comprises moving the ferrule assembly relative to the back body holder in the axial direction. During the relative movement, an orientation of the back body relative to the back body holder, determined by a guide element of the back body, is maintained. The tubular section may for example be a duct as narrow as 3 mm.

22 Claims, 7 Drawing Sheets

(56) References Cited

U.S. PATENT DOCUMENTS

| | | | |
|---|---|---|---|
| 7,178,988 B2 * | 2/2007 | Terakura | G02B 6/3843 |
| | | | 385/53 |
| 7,204,644 B2 * | 4/2007 | Barnes | G02B 6/3806 |
| | | | 385/139 |
| 7,281,859 B2 * | 10/2007 | Mudd | G02B 6/3869 |
| | | | 385/53 |
| 2003/0161586 A1 * | 8/2003 | Hirabayashi | G02B 6/3851 |
| | | | 385/78 |
| 2005/0013549 A1 * | 1/2005 | Terakura | G02B 6/3843 |
| | | | 385/78 |
| 2005/0129378 A1 | 6/2005 | Yamaguchi et al. | |
| 2005/0213890 A1 * | 9/2005 | Barnes | G02B 6/3821 |
| | | | 385/55 |
| 2005/0213892 A1 * | 9/2005 | Barnes | G02B 6/3806 |
| | | | 385/62 |
| 2005/0238292 A1 * | 10/2005 | Barnes | G02B 6/3806 |
| | | | 385/78 |
| 2007/0098331 A1 * | 5/2007 | Mudd | G02B 6/3869 |
| | | | 385/86 |
| 2009/0092360 A1 | 4/2009 | Lin et al. | |
| 2014/0133808 A1 | 5/2014 | Hill et al. | |
| 2016/0047995 A1 | 2/2016 | Ware | |

FOREIGN PATENT DOCUMENTS

| | | |
|---|---|---|
| WO | 2016019992 A1 | 2/2016 |
| WO | 2016061795 A1 | 4/2016 |

* cited by examiner

METHOD OF ASSEMBLING A FIBRE CONNECTOR

CROSS REFERENCE TO RELATED APPLICATIONS

This application is a 35 U.S.C. § 371 National Phase Entry Application from PCT Application No. PCT/EP2017/073931, filed on Sep. 21, 2017, entitled "METHOD OF ASSEMBLING A FIBRE CONNECTOR", and designating the U.S., which claims priority to European Application No. 16190263.0, filed on Sep. 23, 2016, the disclosures of which are incorporated herein in their entireties by reference.

TECHNICAL FIELD

The present disclosure generally relates to connectors for optical fibres, methods for assembling such connectors, and associated assemblies.

BACKGROUND

Traditional telephony services have developed from use of analogue voice, to digital voice, to modem data, and to high speed digital subscriber lines. The traditional copper wires are now at the end of their lifespan as the cost for further increasing bandwidth capabilities is starting to outweigh any possible return. Copper wires are therefore being replaced by optical fibres which are able to provide much higher bandwidth than the copper wires.

An optical fibre may be provided to a house by feeding the fibre through a duct leading to the house. The fibre may for example be fed through the duct by pushing or pulling the fibre through the duct. A commonly used method to feed fibres through ducts is to blow the fibre through the duct using compressed air. At the far side of the duct (for example inside a building to which data is to be delivered by the fibre), the fibre is then be terminated. The end of the fibre is usually placed in a ferrule which is then placed in some type of connector body so as to form a connector at the end of the fibre. When connecting two fibres to each other, the shape of the end faces of the fibres is important for ensuring that losses remain small. The end faces of the fibres may be polished at certain angles to reduce losses. Proper orientation of the fibre ends relative to each other may therefore be important for ensuring that losses remain small. The fibre ends may also be quite fragile. Termination of fibres may therefore require certain skill and may take quite some time to perform. Termination of the fibres in the field may therefore be a bottleneck when fibres are installed into homes.

In order to reduce installation time, some fibres are delivered as pre-terminated fibres. In other words, a ferrule has already been mounted at the end of the fibre in the factory, and is passed though the duct together with the fibre. Although the ferrule has already been mounted, assembly of the rest of the connector may be quite complicated, for example if a certain orientation of the fibre has to be maintained (such as when the fibre has been polished at an angle). Moreover, an assembly from which the connector is assembled may include several quite small parts which have to be assembled in a specific manner to obtain the connector. Parts of the assembly (or even the connector itself once assembled) may be fragile or difficult to handle manually. The assembly may also be complicated and/or expensive to manufacture.

An example of an optical connector suitable for field assembly is described in the U.S. patent application with publication no. U.S. 2016/0047995 A1. A kit comprising certain assembly jigs is employed to assemble a connector at a ferrule coupled to an optical fibre.

However, it would be advantageous to provide new connectors, assemblies and/or methods for assembling connectors which address at least some of the abovementioned issues.

SUMMARY

To better address one or more of the abovementioned issues, methods, assemblies and connectors having the features defined in the independent claims are provided. Preferable embodiments are defined in the dependent claims.

Hence, according to a first aspect, a method is provided. The method comprises providing a ferrule assembly (or ferrule subassembly) mounted at an end of an optical fibre. The ferrule assembly comprises a ferrule and a ferrule back body. The ferrule is mounted in an opening of the ferrule back body. The optical fibre extends through the ferrule along an axial direction of the ferrule assembly. The ferrule back body has a guide element. The method comprises passing the ferrule assembly through a tubular section such that a portion of the optical fibre ends up in the tubular section (in other words, a portion of the optical fibre remains in the tubular section after the ferrule assembly has been passed through the tubular section). The method comprises passing the ferrule assembly through a passage (or opening) of a biasing member, while maintaining a portion of the optical fibre inside the tubular section, until at least a portion of the ferrule back body protrudes out of the passage at a far side of the biasing member. The method comprises inserting the protruding at least a portion of the ferrule back body into an opening of a ferrule back body holder (or retaining member). The insertion comprises moving the ferrule assembly relative to the ferrule back body holder in the axial direction until at least a portion of the ferrule back body is located in the opening of the ferrule back body holder. The insertion also comprises maintaining, during the relative movement in the axial direction, an orientation of the ferrule back body relative to the ferrule back body holder determined by the guide element. The method comprises attaching the ferrule back body holder to the at least a portion of the ferrule back body located in the opening of the ferrule back body holder, the ferrule back body holder thereby preventing the ferrule assembly from passing back through the passage of the biasing member.

The guide element of the ferrule back body allows for obtaining a certain orientation of the ferrule back body relative to the ferrule back body holder. This orientation may be important in case the optical fibre and/or the ferrule is not rotationally symmetric with respect to the axial direction. For example, the fibre may have been polished at an angle, such that any other fibre to be connected to the fibre has to be appropriately oriented (or aligned) for ensuring low connection losses.

The ability to pass the ferrule assembly through the biasing member allows the biasing member to be put in position (such as arranging the biasing member around the fibre) after passing the ferrule assembly through the tubular section. Therefore, the biasing member need not be passed through the tubular section. Biasing members which are too large to fit in the tubular section may therefore be employed. In cases where the tubular section is narrow (such as in the case of microducts), it may be difficult to provide biasing members small enough to fit in the tubular section and which still have the desired biasing properties and/or durability. The option to use larger biasing members is there advantageous.

Another advantage of not having to pass the biasing member through the tubular section is that the biasing member (which may for example be a coil spring) does not run the risk of getting stuck in the tubular section (e.g. due to joints in the tubular section), and dirt or moisture which could be present in the tubular section may not affect the performance and/or durability of the biasing member.

Attachment of the ferrule back body holder to the ferrule back body after the ferrule assembly has been passed through the tubular section enables the ferrule assembly to be made smaller, so as to be passed through more narrow tubular sections than if the ferrule back body holder would have been mounted at the ferrule back body from the start of the method.

The insertion of the ferrule back body in the opening ferrule back body holder via relative movement in the axial direction is a simple step that may be easily performed in the field. Due to the guide element, orientation of the ferrule back body and the ferrule back body holder relative to each other is easily maintained during this relative movement. In contrast to the assembling method described in the above-mentioned document US 2016/0047995 A1, the present method requires no special assembly jigs.

The present method may for example be a method of assembling a connector.

The axial direction of the ferrule assembly may for example be an axial direction of the ferrule (and/or of the ferrule back body). The ferrule may for example be cylindrical.

The guide element (or key way) may for example be a recess. The guide element may for example extend in the axial direction.

The step of passing the ferrule assembly through the tubular section may for example be performed by pushing, pulling or blowing the ferrule assembly (and the fibre at which it is mounted) through the tubular section.

The tubular section may for example be a duct, a microduct, flexible tubing, or braided tubing.

The step of passing the ferrule assembly through a passage of a biasing member may for example be performed by moving the biasing member and/or by moving the ferrule assembly.

The biasing member may for example be a spring, such as a coil spring or helical spring.

It will be appreciated that the optical fibre may for example move relative to the tubular section during the step of passing the ferrule assembly through the passage of the biasing member. It will be appreciated that the portion of the fibre located in the tubular section may therefore change during this step.

According to some embodiments, the movement of the ferrule assembly relative to the ferrule back body holder in the axial direction may be initiated with the ferrule (or the end face of the optical fibre) facing towards the opening of ferrule back body holder. In other words, at least part of the ferrule may enter the opening of the ferrule back body holder before the ferrule back body.

The orientation of the ferrule back body may for example be maintained throughout this relative movement in the axial direction.

According to some embodiments, attaching the ferrule back body holder to the at least a portion of the ferrule back body located in the opening of the ferrule back body holder may comprise inserting the protruding at least a portion of the ferrule back body a certain distance into the opening of the ferrule back body holder such that a fastening element snaps into place. In other words, there may be no need for any specific or complicated action for attaching the ferrule back body holder to the ferrule back body, as the fastening element snaps into place by itself.

The fastening element may for example be comprised in the ferrule back body or the ferrule back body holder. The fastening element may for example snap into place such that it engages with a recess or opening of the ferrule back body when the at least a protruding portion of the ferrule back body is inserted the certain distance into the opening of the ferrule back body holder.

According to some embodiments, the method may comprise, prior to passing the ferrule assembly through the passage of the biasing member, passing the ferrule assembly through a passage of a first housing member (or rear housing member), while maintaining a portion of the optical fibre inside the tubular section, until at least a portion of the ferrule back body protrudes out of the passage of the first housing member at a far side of the first housing member. In other words, the ferrule assembly is passed so far into the passage from one side of the first housing member that at least a portion of the ferrule back body exits the passage at the other side of the first housing member.

The step of passing the ferrule assembly through a passage of the first housing member may for example be performed by moving the first housing member and/or by moving the ferrule assembly.

According to some embodiments, the method may comprise, after attaching the ferrule back body holder, attaching a second housing member (or front housing member) to the first housing member to form a housing enclosing the biasing member, the ferrule back body and the ferrule back body holder. The second housing member may have an opening for allowing contact between the optical fibre and another optical fibre.

The ferrule may for example extend out of the housing through the opening of the second housing member.

The method may for example be a method for assembling a connector. The connector may for example comprise the ferrule assembly, the ferrule back body holder, the biasing member, the first housing member and the second housing member.

According to a second aspect, there is provided an assembly. The assembly (or connector assembly, or optical fibre connector assembly) comprises a ferrule, a ferrule back body, a biasing member and a ferrule back body holder. The ferrule has an opening (or bore, or through hole) extending through the ferrule for accommodating an end portion of an optical fibre. The ferrule back body has an opening (or bore, or through hole) for insertion of the ferrule along an axial direction. The ferrule back body has a guide element. The biasing member has a passage (or through hole) sized to allow the ferrule and the ferrule back body to pass through the biasing member. The ferrule back body holder has an opening adapted to receive at least a portion of the ferrule back body via movement (or motion) of the ferrule back body relative to the ferrule back body holder in the axial direction. The opening of the ferrule back body holder is shaped (or has a geometry adapted) to engage with the guide element for maintaining a certain orientation of the ferrule back body relative to the ferrule back body holder. The ferrule back body holder has a fastening element for attaching the ferrule back body holder to the at least a portion of the ferrule back body. The passage of the biasing member is sized to prevent the ferrule back body from passing through the passage of the biasing member when the ferrule back body is attached to the ferrule back body holder.

The opening of the ferrule back body holder may for example be shaped to engage with the guide element for maintaining a certain orientation (or a certain rotational orientation with respect to the axial direction) of the ferrule back body relative to the ferrule back body holder during insertion of the ferrule back body into the opening of the ferrule back body holder.

The fastening element of the ferrule back body holder may for example be arranged to attach the ferrule back body holder to the at least a portion of the ferrule back body when the ferrule back body is inserted into the opening of the ferrule back body holder. The fastening element may for example be a protruding element (such as a snap fit element for snapping into a recess) or the fastening element may for example be a recess for receiving a protruding element of the ferrule back body.

The assembly may for example be a connector assembly, or an optical fibre connector assembly.

The opening of the ferrule may for example extend through the ferrule in the axial direction.

The biasing member may for example be a spring, such as a coil spring.

According to some embodiments, the guide element may extend in the axial direction along an exterior surface of the ferrule holder. A guide element extending in the axial direction along an exterior surface of the ferrule holder may be easy to provide during manufacture of the ferrule back body. To provide a guide element extending in the axial direction along an exterior surface of the ferrule holder may be a reliable way to maintain a certain orientation of the ferrule back body relative to the ferrule back body holder during insertion of the ferrule back body into the opening of the ferrule back body holder.

According to some embodiments, the guide element may be a recess. Compared to protruding guide elements, a recess may be less likely to get stuck in the tubular section in case the inner walls of the tubular section are uneven (for example due to the joints) or in case there is dirt in the tubular section.

According to some embodiments, the ferrule holder may have a recess with which the fastening element of the ferrule back body holder is adapted to engage for attaching the ferrule back body holder to the at least a portion of the ferrule holder.

The recess with which the fastening element of the ferrule back body holder is adapted to engage may for example be distinct from the guide element.

According to some embodiments, the recess of the ferrule back body may be an annular recess. Such an annular recess may be easy to provide during manufacture of the ferrule back body.

According to some embodiments, the ferrule may be mounted in the opening of the ferrule back body. The assembly may comprise an end portion of an optical fibre accommodated in the opening of the ferrule. An end face of the optical fibre may have been polished at an angle.

Losses at a connection between two fibres may be reduced if the end faces are polished at an angle rather than being orthogonal to the axial direction of the fibres. However, proper orientation of the fibres may be important to ensure that the two end faces match each other, so as to provide a good connection (or low connection losses) between the fibres. The guide element facilitates provision of such orientation.

The angle of the end face may for example have been provided in a certain direction relative to the guide element (or at a certain orientation relative to the guide element) so that one may easily keep track of how the end face angle is oriented.

According to some embodiments, the assembly may comprise a first housing member (or rear housing member) having a passage (or through hole) sized to allow the ferrule and the ferrule back body to pass through the first housing member. The passage of the first housing member may be sized to prevent the biasing member from passing through the passage of the first housing member.

According to some embodiments, the assembly may comprise a second housing member (or front housing member). The first and second housing members may be shaped to match each other so as to form a housing when attached to each other.

The first and second housing members may for example be shaped such that, when attached to each other to form the housing, the ferrule back body and back body holder may piston within the housing in the axial direction, wherein the biasing member biases the ferrule towards the second housing member.

The second housing member may for example have an opening for allowing the ferrule to extend out of the housing. The opening may for example be sized to prevent the ferrule back body from passing through the opening of the second housing member when attached to the ferrule back body holder.

According to some embodiments, the first and second housing members may be shaped such that the housing has the same exterior shape as the housing of an LC connector (or Lucent connector) or a MU connector (or miniature connector).

According to some embodiments, the assembly may comprise a sealing element for sealing the passage of the first housing member around the optical fibre, or around a protective coating (such as a cable jacket) enclosing the optical fibre. The sealing element (for example in combination with further sealing elements described below) may prevent water from entering the housing, and may therefore allow the housing to be employed outdoors.

The sealing element may for example be a rubber ring.

The assembly may for example comprise a clamp (or crimp) for holding the sealing element in position.

According to some embodiments, the second housing member may have an opening for allowing the ferrule to extend out of the housing. The assembly may comprise an interconnection member (or adaptor) for connecting the optical fibre to another optical fibre. The interconnection member may comprise an opening for receiving the housing, a sealing element for sealing the opening of the interconnection member around the housing, and a passage in the opening of the interconnection member for receiving the ferrule.

The sealing element of the interconnection member may for example prevent water from entering the housing through the opening of the second housing member when the housing has been received in the opening of the interconnection member.

The interconnection member may for example comprise an additional opening for receiving an additional housing, an additional sealing element for sealing the additional opening of the interconnection member around the additional housing, and an additional passage in the additional opening of the interconnection member for receiving an additional ferrule. The opening and additional opening may for example be arranged opposite each other so as to receive housings facing towards each other for connecting respective optical fibres.

According to a third aspect, there is provided a connector. The connector has been obtained by the method according to the first aspect. The connector comprises the ferrule, the ferrule back body, the biasing member, the ferrule back body holder, the first housing member, and the second housing member.

The ferrule back body holder may for example be formed in one piece. In other words, the ferrule back body holder may for example not have been assembled from multiple pieces.

The connector may for example be an LC connector or an MU connector.

The advantages presented above for features of methods, according to the first aspect, may generally be valid for the corresponding features of assemblies according to the second aspect and connectors according to the third aspect. Similarly, the advantages presented above for features of assemblies, according to the second aspect, may generally be valid for the corresponding features of methods according to the first aspect and connectors according to the third aspect.

It is noted that embodiments of the present disclosure relate to all possible combinations of features recited in the claims. Further, it will be appreciated that the various embodiments described for the method, according to the first aspect, are all combinable with embodiments of the assembly according to the second aspect and the connector according to the third aspect. It will also be appreciated that the various embodiments described for the assembly, according to the second aspect, are all combinable with embodiments of the method according to the first aspect and the connector according to the third aspect.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
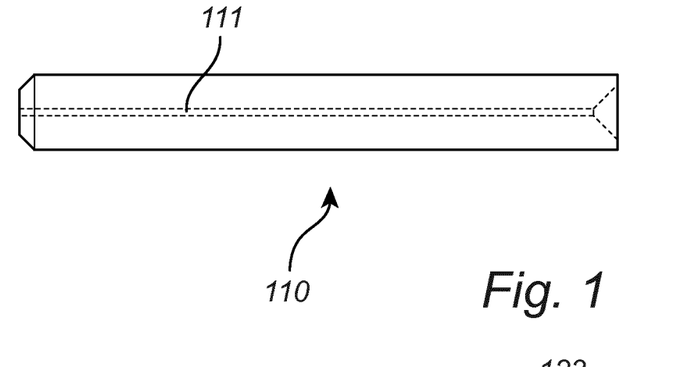
FIG. 1 shows a ferrule.

An assembly will be described below with reference to FIGS. 1-8, according to an embodiment. The assembly comprises a ferrule 110, a ferrule back body 120, a biasing member 130, and a ferrule back body holder 140. Optionally, the assembly may further comprise a first housing member 150 (or first enclosing member) and a second housing member 160 (or second enclosing member) shaped to mach each other so as to form a housing when attached to each other. As described below, the pieces of the assembly may be shaped to fit together so as to form a connector. The ferrule 110, the ferrule back body 120, the biasing member 130, and the ferrule back body holder 140 may together be regarded as a subassembly which may for example be sold or delivered together. By adding the first housing member 150 and the second housing member 160, an assembly may be formed from which a connector having a housing may be assembled. FIG. 1 is a perspective view of the ferrule 110. The ferrule 110 has an opening 111 (or bore, or through hole) extending through the ferrule 110 for accommodating an end portion of an optical fibre.

In the present embodiment, the ferrule 110 has a cylindrical shape and the opening 111 extends along the center of the ferrule 110 along its axis of symmetry. The ferrule 110 may be a high precision product for keeping losses low when connecting the ferrule 110 to a mating ferrule housing another optical fibre. The position and diameter of the opening 111 may be important factors. The opening 111 may for example have a diameter of 125.5 micrometers for accommodating a fibre with a diameter of 125 micrometers and may for example be located at the very center of the ferrule 110. The ferrule 110 may for example be of a ceramic material.

Figure 2:
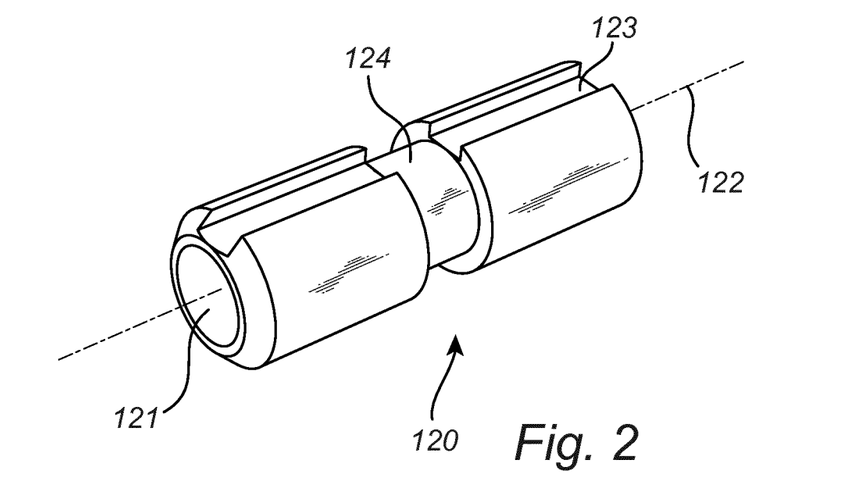
FIGS. 2-4 are different views of a ferrule back body.
Figure 3:
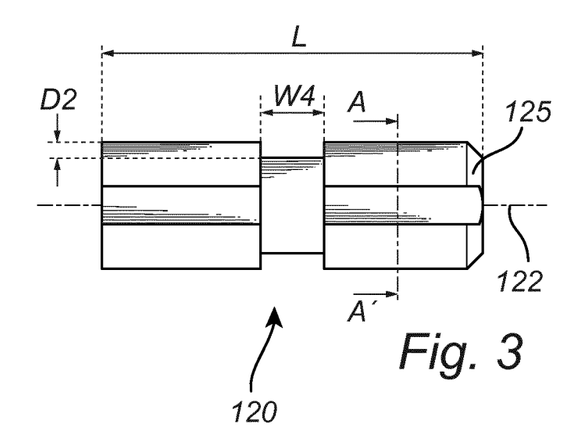
Figure 4:
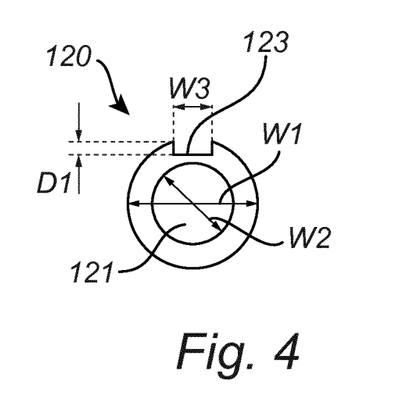

FIG. 2 is a perspective view of the ferrule back body 120, FIG. 3 is a side view of the ferrule back body 120, and FIG. 4 is cross sectional view of the ferrule back body 120 along the line A-A'. The ferrule back body 120 has an opening 121 for insertion of the ferrule 110 along an axial direction 122. The ferrule back body 120 has a guide element 123 which may also be referred to as a keyway 123.

In the present embodiment, the ferrule back body 120 is cylindrical and the opening 121 extends along the center (or axis of symmetry) of the ferrule back body 120. The ferrule back body 120 may for example be made of metal or plastic material.

In the present embodiment, the guide element 123 is a recess 123 extending in the axial direction 122 along the exterior surface of the ferrule back body 120. Such a recess 123 is easy to provide during manufacture of the ferrule back body 120. Embodiments may also be envisaged in which the guide element 123 includes multiple recesses, and/or one or more protruding elements.

In the present embodiment, the ferrule back body 120 has a recess 124 for fastening elements of the ferrule back body holder 140 (described below with reference to FIG. 6) to engage with. The recess 124 may for example be an annular recess 124 which extends all the way around the ferrule back body 120. Although annular recesses 124 may be easier to provide during manufacture of the ferrule back body 120, embodiments may also be envisaged in which the ferrule back body 120 has other types of recesses, or slots, or grooves, to which the ferrule back body holder 140 may attach, or a recess extending only partway around the ferrule back body 120.

Example dimensions for the ferrule back body 120 are given below. The person skilled in the art realizes that these dimensions merely serve as examples, and that other dimensions than those in the example may also be employed.

The ferrule back body 120 may have a length L of 6 mm and a width W1 of 2 mm. The opening 121 may extend through the entire ferrule back body 120 along the axial direction 122 and may have a width W2 of 1.25 mm for insertion of a ferrule of diameter 1.25 mm (or slightly less than 1.25 mm). The recess 123 forming the guide element 123 may have a width W3 of 0.6 mm and a depth D1 of 0.2 mm. The annular recess 124 may be arranged at (or close to) the middle of the ferrule back body 120, it may have a width W4 of 1 mm and a depth D2 of 0.25 mm. The recess 123 forming the guide element 123 may comprise one portion on each side of the annular recess 124. The ferrule back body 120 may be tapered 125 at a front end at from which the ferrule 110 is to extend when mounted in the opening 121 of the ferrule back body 120.

Figure 5:
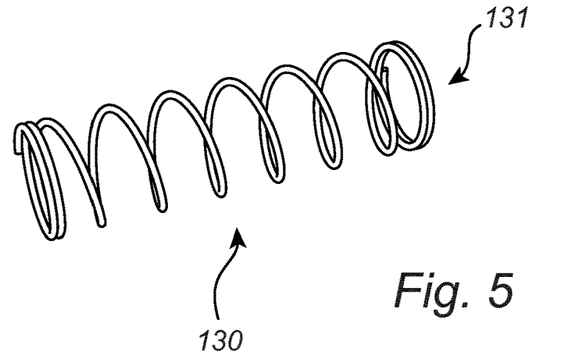
FIG. 5 shows a biasing member.

FIG. 5 is a perspective view of the biasing member 130, exemplified herein by a coil spring 130 of metal (for example iron). The biasing member 130 has a passage 131 sized to allow the ferrule 110 and the ferrule back body 120 to pass through the biasing member 130. The passage 131 is sized to prevent the ferrule back body 120 from passing through the passage 131 when attached to the ferrule back body holder 140 (described below with reference to FIG. 6). If the ferrule back body 120 has a width W1 (or diameter) of 2 mm and the ferrule back body holder 140 has a width (or diameter) of 3 mm, the opening 131 of the biasing member 130 may for example be 2.1 mm wide.

The biasing member 130 (or coil spring 130) may for example be of similar length (when not compressed, i.e., when in its resting position) as the ferrule 110.

Although metal coil springs 130 (or helical springs) are suitable as biasing members 130 due to their reliability and low cost, any biasing member 130 able to provide similar biasing, and having a passage 131 of similar shape as the passage of the coil spring 130 may be employed instead of the coil spring 130. Alternative biasing members 130 may for example be formed as annularly shaped pieces of suitable resilient materials (i.e., which is able to expand after being compressed, so as to provide a suitable biasing force)

Figure 6:
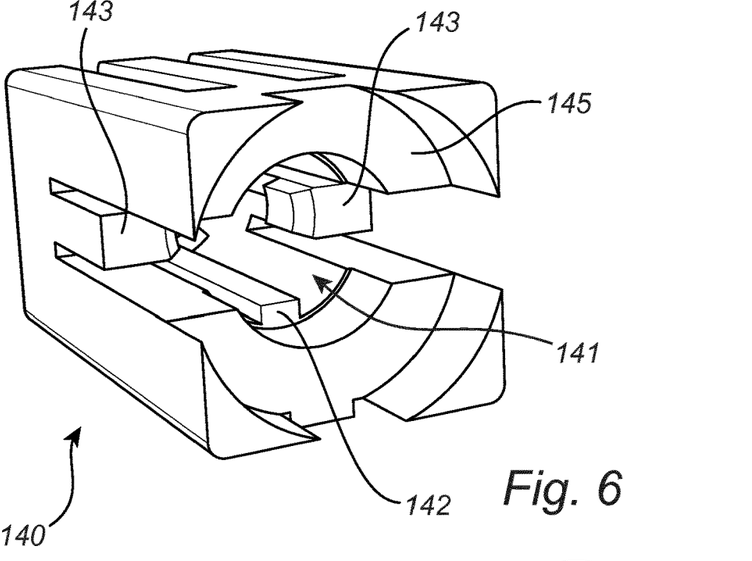
FIG. 6 shows a ferrule back body holder for use in an LC connector.

FIG. 6 is a perspective view of the ferrule back body holder 140 (or simply back body holder 140). The back body holder 140 has an opening 141 adapted to receive at least a portion of the ferrule back body 120 via movement of the ferrule back body 120 relative to the back body holder 140 in the axial direction 122. The opening 141 of the back body holder 140 is shaped to engage with the guide element 123 of the ferrule back body 120 for maintaining a certain orientation of the ferrule back body 120 relative to the back body holder 140. In the present embodiment, a protrusion 142 along an interior wall of the opening 141 is arranged to engage with the guide element 123 of the ferrule back body 120 for maintaining the orientation during insertion of the ferrule back body 120.

The back body holder 140 has fastening elements 143 for attaching the ferrule back body holder 140 to the portion of the ferrule back body 120 inserted into the opening 141. The fastening elements 143 are exemplified herein by two arms 143 arranged to engage with the recess 124 of the ferrule back body 120 when the ferrule back body 120 is inserted far enough into the opening 141 of the back body holder 140. The fastening elements 143 and the recess 124 together form a convenient snap fit design.

In the present embodiment, the back body holder 140 has a rectangular shape. The back body holder 140 may for example be made of a plastic material. The back body holder 140 may for example be formed (e.g. molded) in one piece rather than being assembled from multiple pieces.

Figure 7:
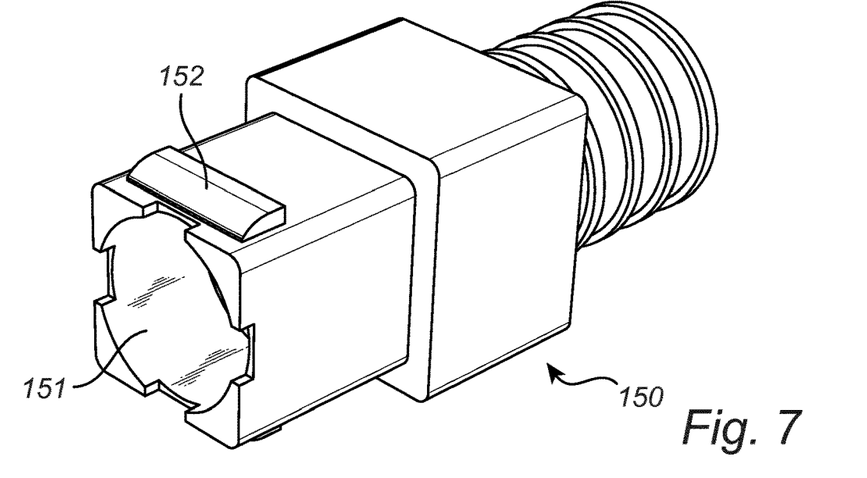
FIG. 7 shows a first housing member for use in an LC connector.

FIG. 7 is a perspective view of the first housing member 150 which will be referred to herein as a rear connector housing 150. The rear connector housing 150 has a passage 151 sized to allow the ferrule 110 and the ferrule back body 120 to pass through the rear connector housing 150. The passage 151 of the rear connector housing 150 is sized to prevent the biasing member 130 from passing through the passage 151 of the rear connector housing 150. The rear connector housing 150 may for example comprise a surface within the passage 151 adapted to retain the biasing member 130.

If for example the ferrule back body 120 has a width W1 of 2 mm and the biasing member has a diameter (or width) of 2.5 mm, the passage 151 of the rear connector housing 150 may for example have a width of 2.3 mm.

Figure 8:
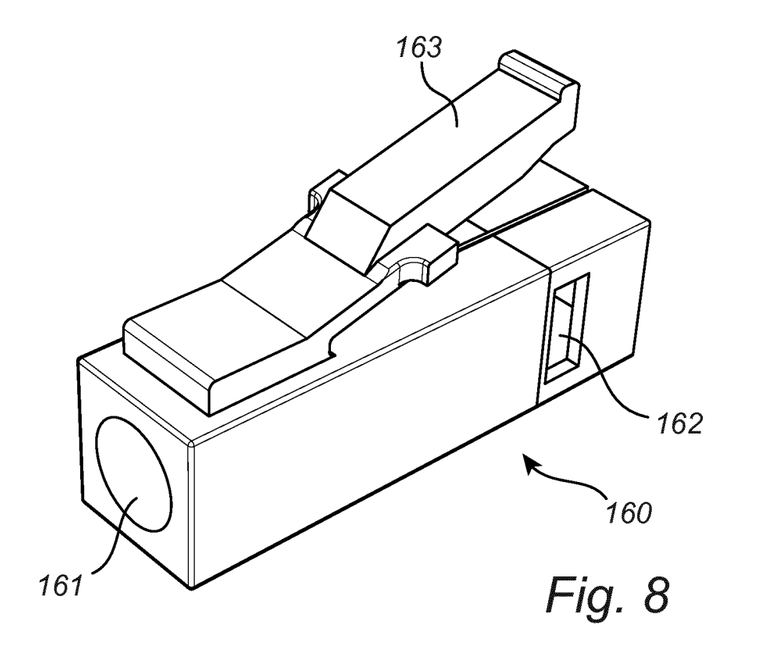
FIG. 8 shows a second housing member for use in an LC connector.

FIG. 8 is a perceptive view of the second housing member 160 which will be referred to herein as a front connector housing 160. The front connector housing 160 has an opening 161 for allowing the ferrule 110 to extend out of the housing formed by the rear and front connector housings 150 and 160.

In the present embodiment, the rear and front connector housings 150 and 160 are shaped to snap fit together to form a housing. The rear connector housing has protrusions 152 positioned and shaped to match openings 162 in the front connector housing 160. The front connector housing 160 comprises the same type of push button 163 as an LC connector (or Lucent connector).

In the present example, the rear connector housing 150 and the front connector housing 160 are shaped such that the housing has the same exterior shape as an LC connector (or Lucent connector). Embodiments may also be envisaged wherein the rear connector housing 150 and the front connector housing 160 are shaped such that the housing has the same exterior shape as another type of connector, such as a MU connector (or miniature unit).

The front connector housing 150 and the rear connection housing 160 may for example be made of a plastic material.

Figure 9:
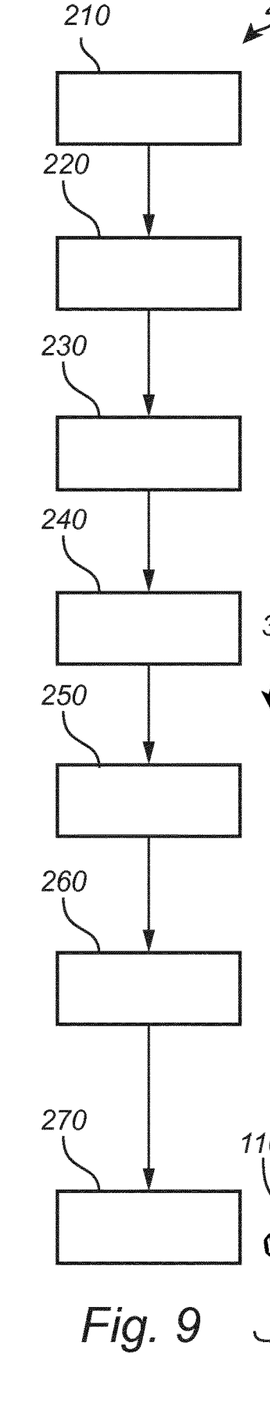
FIG. 9 is a flow chart of a method of assembling an LC connector using the components shown in FIGS. 1-8, according to an embodiment.

FIG. 9 is a flow chart of a method 200 of assembling an LC connector using the assembly described with reference to FIGS. 1-8, according to an embodiment. The method 200 will be described also with reference to FIGS. 10-15 which illustrate the respective steps of the method 200.

Figures 10, 11:
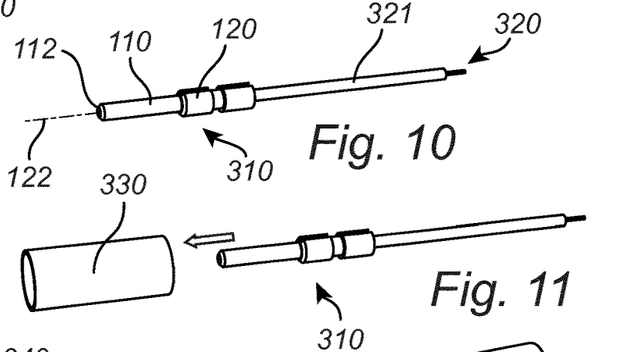
FIGS. 10-15 illustrate the respective steps of the method shown in FIG. 9.

The method 200 comprises providing 210 a ferrule assembly 310 (or ferrule subassembly) mounted at an end of an optical fibre 320. This step 210 is illustrated in FIG. 10. The ferrule assembly 310 comprises the ferrule 110 and the ferrule back body 120. The ferrule 110 is mounted in the opening 121 of the ferrule back body 120. The optical fibre 320 extends through the ferrule 110 along the axial direction 122. And end face of the optical fibre 320 is located at a tip end 112 of the ferrule 110. The ferrule assembly 310 may for example be assembled in a factory and brought to a location where a connector is to be assembled.

In the present embodiment, the optical fibre 320 is provided in a cable 321 comprising one or more protecting layers enclosing the fibre 320.

The end face of the optical fibre 320 may for example be polished at an angle for reducing losses when connected to another optical fibre. The angle may for example be 4, 8 or 9 degrees relative to a plane orthogonal to the axial direction 122. The polishing may for example be performed in a factory, but could alternatively be performed in the field. The polishing of the end face of the fibre 320 may be performed by polishing the tip end 112 of the ferrule 110. The annular recess 124 may be employed to hold the ferrule assembly 310 at a fixed axial position during polishing. The guide element 123 may be employed to hold the ferrule assembly 310 at a certain rotational position (or orientation) around the axis 122 during polishing, so that the guide element 123 may later be employed to keep track of the orientation of the polished end face (and of the fibre 320).

The method 200 comprises passing 220 the ferrule assembly 310 through a tubular section 330 such that a portion of the optical fibre 320 ends up in the tubular section 330. This step 220 is illustrated in FIG. 11.

The tubular section 330 may for example be a duct or tube of more or less any kind (such as a microduct, flexible tubing, or braided tubing). The ferrule assembly 310 may for example be passed through the tubular section 330 by blowing the ferrule assembly 310 through the tubular section 330 (henceforth referred to as a duct 330). The ferrule assembly 310 may for example be passed through the duct 330 by pushing or pulling the ferrule assembly 310 through the duct 330. If the ferrule assembly 310 is pushed or pulled through the duct 330, this process may for example be assisted by causing a vacuum at the receiving end so as to suck the ferrule assembly 310 through the duct 330. During blowing (or vacuum assisted pushing or pulling) of the ferrule assembly 310 through the duct 330, the ferrule assembly 310 may be equipped with a sealing ring (not shown in FIG. 11) to improve the effect of the blowing (or of the vacuum).

Figures 12, 13:
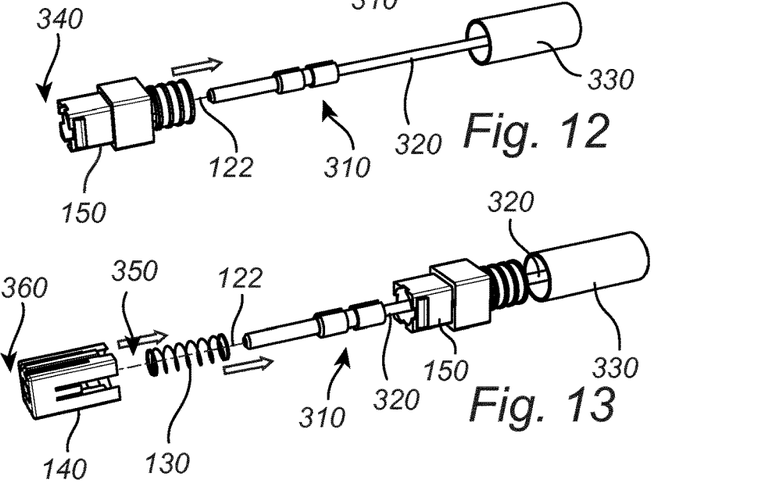

The method 200 comprises passing 230 the ferrule assembly 310 through the passage 151 of the rear connector housing 150 (or first housing member 150) until at least a portion of the ferrule back body 120 protrudes out of the passage 151 of the rear connector housing 150 at a far side 340 of the rear connector housing 150. This step 230 is performed while a portion of the optical fibre 320 remains inside the duct 330, and is illustrated in FIG. 12. The step of passing 230 the ferrule assembly 310 through the passage 151 of the rear connector housing 150 may for example be performed by moving the rear connector housing 150 in the axial direction 122 while keeping the ferrule assembly for more less 310 fixed.

The method 200 comprises passing 240 the ferrule assembly 310 through the passage 131 of the biasing member 130 until at least a portion of the ferrule back body 120 protrudes out of the passage 131 at a far side 350 of the biasing member 130. This step 240 is performed while a portion of the optical fibre 320 remains inside the duct 330.

The method 200 comprises inserting 250 the protruding portion of the ferrule back body 120 into the opening 141 of the back body holder 140. The steps 240 and 250 are illustrated in FIG. 13.

The insertion 250 comprises moving the ferrule assembly 310 relative to the back body holder 140 in the axial direction 122 until at least a portion of the ferrule back body 120 is located in the opening 141 of the back body holder 140. When the movement is initiated, the ferrule assembly 131 is oriented such that the ferrule 110 faces towards the opening 141 of the back body holder 140. The tip end 121 of the ferrule 110 therefore enters the opening 141 of the back body holder 140 before the ferrule back body 120 enters this opening 141.

The insertion 250 also comprises maintaining, during the relative movement in the axial direction 122, an orientation of the ferrule back body 120 relative to the back body holder 140, determined by the guide element 123. In the present embodiment, the protrusion 142 in the opening 141 of the back body holder 140 fits in the guide element 123 (which is a recess 123 extending in the axial direction 122). When the ferrule back body 120 is inserted into the opening 141 of the back body holder 140, the protrusion 142 slides along the guide element 123 and ensures that the ferrule assembly 310 (and the polished end face of the optical fibre 320) is properly oriented relative to the back body holder 140.

Figure 14:
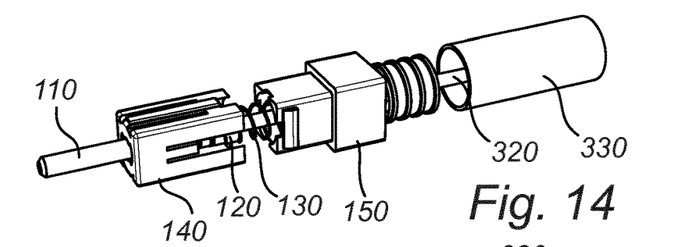

The method 200 comprises attaching 260 the back body holder 140 to the portion of the ferrule back body 120 located in the opening 141 of the back body holder 140. The size of the back body holder 140 thereby prevents the ferrule assembly 310 from passing back through the passage 131 of the biasing member 130. This step 260 is illustrated in FIG. 14.

The back body holder 140 may be attached 260 to the ferrule back body 120 via a snap fit design. In other words, a fastening element may snap into place when the ferrule back body 120 is inserted a certain distance into the opening 141 of the back body holder 140. In the present embodiment, fastening elements 143 in the form of two arms 143 snap into place in the annular recess 124 of the ferrule back body 120, thereby attaching 260 the back body holder 140 to the ferrule back body 120.

When the back body holder 140 has been attached to the ferrule back body 120, the ferrule 110 extends out through a passage at the back of the opening 141 of the back body holder 140. This passage of the back body holder 140 is sized to prevent the biasing member 130 from passing through the back body holder 140. The back body holder 140 may for example comprise a surface 145 (shown in FIG. 6) at the opening 141 adapted to retain the biasing member 130.

If the back body holder 140 would have been attached to the ferrule back body 120 from above, it would have needed to be open at the bottom to allow the fibre 320 to enter the back body holder 140. As the back body holder 140 is instead attached from the front of the ferrule assembly 310 (via relative movement in the axial direction 122) the back body holder 140 may extend all the way around the ferrule back body 120 (i.e. a full rotation around the axis 122). The back body holder 140 therefore better protects the fibre 320 from side pulls or other potential deformations which could harm the fibre 320 and/or increase losses in the fibre 320.

Figure 15:
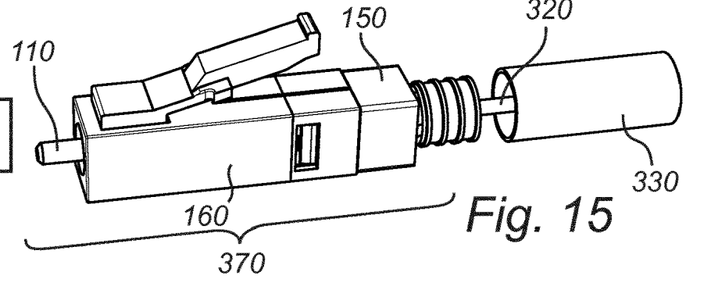

The method 200 comprises attaching 270 the front connector housing 160 (or second housing member 160) to the rear connector housing 150 to form a housing enclosing the biasing member 130, the ferrule back body 120 and the back body holder 140. This step 270 is illustrated in FIG. 15.

When assembled, the assembly described with reference to FIGS. 1-8 form an LC connector 370. The housing formed by the rear connector housing 150 and the front connector housing 160 has the same exterior shape as a regular LC connector but has an interior shape specifically adapted to house the other components of the assembly.

The ferrule 110 extends out of the opening 161 of the front connector housing 161. The end face of the optical fibre 320 is therefore exposed, and can for example be cleaned. The spring 130 biases (or pushes) the ferrule assembly 310 (and the back body holder 140 attached thereto) forward towards the front connector housing 160 such that the back body holder 140 rests against (or is in abutment to) an interior surface of the front connector housing 160. The spring 130 allows the ferrule assembly 310 (and the back body holder 140 attached thereto) to piston backwards within the housing along the axial direction 122 if subjected to a force. The bias provided by the spring 130 allows the ferrule 110 to be placed tightly in contact with another ferrule, without being damaged in case of a slight mismatch. This type of spring based ferrule 110 is sometimes referred to as a floating ferrule. When in its resting position, the ferrule may for example extend 2 mm out of the opening 161 of the front connector housing 160.

The front connector housing 160 may for example have an interior shape, and/or the back body holder 140 may for example have an exterior shape, which only allows the ferrule assembly 310 (to which the back body holder 140 is attached) to have a particular orientation within the housing. This facilitates correct orientation of the ferrule 110 with a mating ferrule when the connector 370 is employed to connect the optical fibre 320 with another optical fibre.

The ferrule back body 120 described with reference to FIG. 2 has a shape (a guide element 123 in the form of a recess 123 extending along axial direction and an annular recess 124 for attaching the back body holder 140) which makes it easy to manufacture. As the ferrule back body 120 has no protruding portions (except the ferrule 110) the risk of the ferrule assembly 310 getting stuck in the duct 330 due to splices in the duct 330 or dirt in the duct 330 is reduced. The shape of the ferrule back body 120 also allows the ferrule assembly 310 to be made small enough to be blown (or pushed or pulled) through narrow ducts 330. A widest portion of the ferrule back body 120 may for example be no more than a factor 2 or 3 times as wide as the widest portion of the ferrule 110. The ferrule back body may for example be no more than 2, 2.1, 2.2, 2.5 or 3 mm wide. A ferrule mounted at a 1.25 micrometer diameter optical fibre may therefore be blown through a microduct of having a diameter of 3 mm.

Since the spring 130 does not need to be fed through the duct 330, there is no need to make the spring 130 small enough to fit into the duct 330. The spring 130 may therefore be made as large as needed to obtain the desired biasing force and/or durability.

Figure 16:
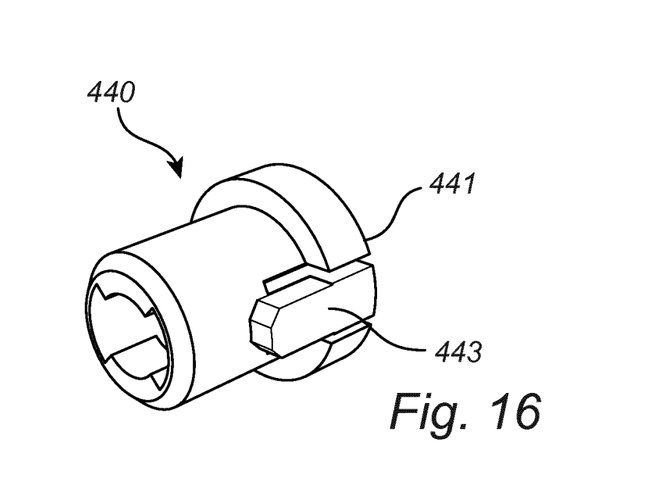
FIG. 16 shows a ferrule back body holder for use in a connector adapted for outdoor use.

FIGS. 16-21 show parts of an assembly. In contrast to the assembly described with reference to FIGS. 1-15, the assembly described with reference to FIGS. 16-21 is better suited for outdoor use. FIG. 16 shows a ferrule back body holder 440 (henceforth referred to as a back body holder 440) which is cylindrical in contrast to the rectangular back body holder 140, described with reference to FIG. 6. Similarly to the back body holder 140, described with reference to FIG. 6, the back body holder 440 has arms 443 for engaging with the annular recess 124 of the ferrule back body 120. The back body holder 440 also has an opening 441 with a geometry for interacting with the guide element 123 of the ferrule back body 120 for maintaining a certain orientation.

Figure 17:
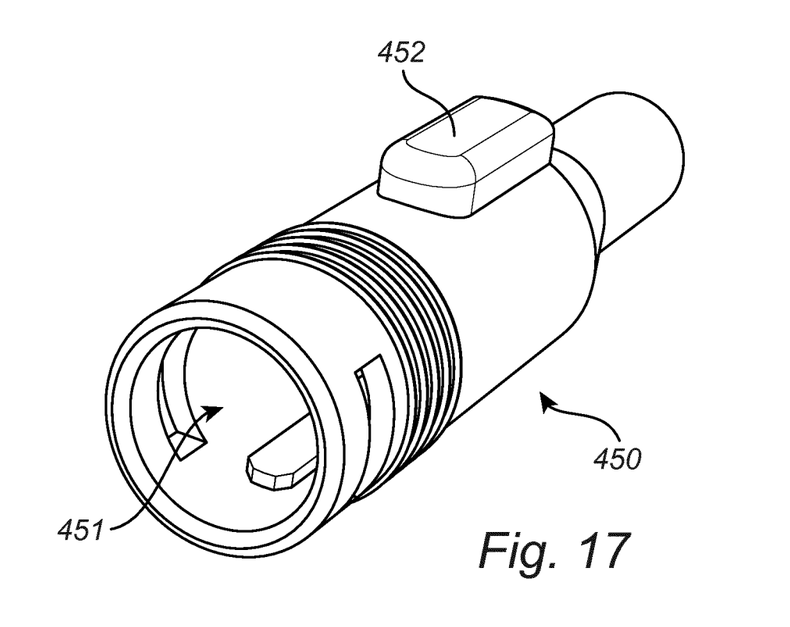
FIG. 17 shows a first housing member for use in a connector adapted for outdoor use.

FIG. 17 shows a first housing member 450 (henceforth referred to as a rear connector housing 450). Similarly to the rear housing member 150, described with reference to FIG. 7, the rear hosing member 450 has a passage 151 sized to allow the ferrule 110 and the ferrule back body 120 to pass through the rear connector housing 450. The passage 451 is sized to prevent the biasing member 130 from passing through the passage 451. The rear connector housing 450 has an external guide element 452 to keep track of the orientation of the fibre 320 mounted in the ferrule 110.

Figure 18:
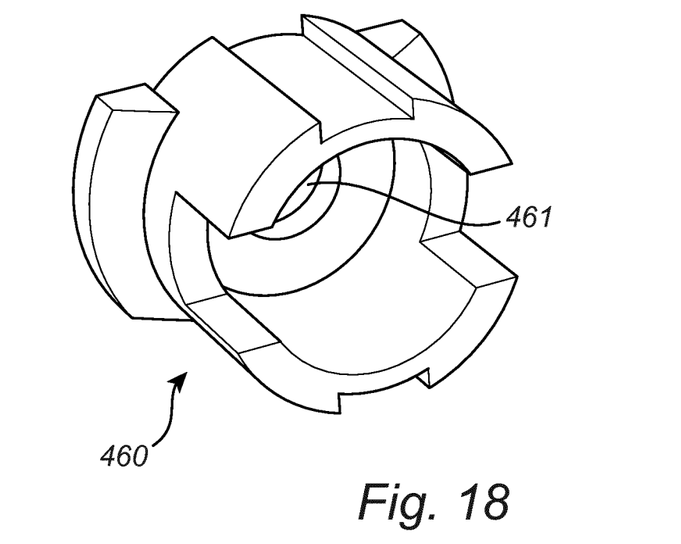
FIG. 18 shows a second housing member for use in a connector adapted for outdoor use.

FIG. 18 shows a second housing member 460 (henceforth referred to as a front connector housing 460). Similarly to the connector housings 150 and 160, described with reference to FIGS. 7 and 8, the rear connector housing 450 and the front connector housing 460 are shaped to match each other so as to form a housing when attached to each other. The front connector housing 460 has a passage 461 sized to allow the ferrule 110 to extend out of the housing.

Figure 19:
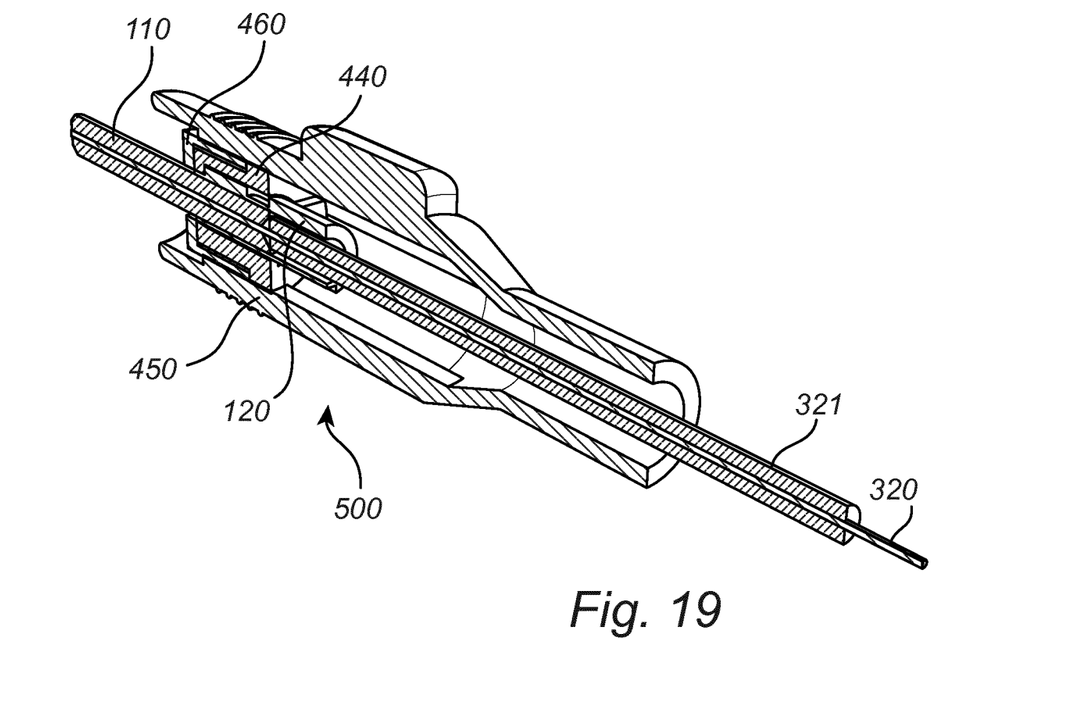
FIG. 19 shows a connector for adapted outdoor use, according to an embodiment.

FIG. 19 is a cross sectional view of a connector 500. The connector 500 has been assembled from the assembly comprising the ferrule 110, the ferrule back body 120, the biasing member 130, the back body holder 440, the rear connector housing 450 and the front connector housing 460. It will be appreciated that the connector 500 may be assembled using the same method 200 (described above with reference to FIGS. 9-15) as the LC connector 370 except that the pieces employed have different shapes. In contrast to the LC connector 370, the present connector 500 has a cylindrical shape. Similarly to the LC connector 370, the present connector 500 allows the ferrule 110, the ferrule back body 120 and the back body holder 440 to piston along an axial direction relative to the housing.

Figure 20:
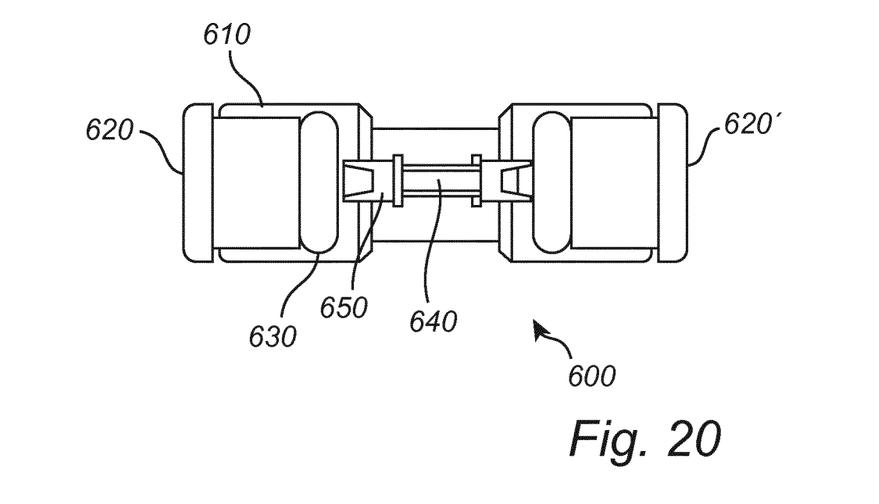
FIG. 20 shows an interconnection member for use with the connector shown in FIG. 19.

FIG. 20 is a side view of an interconnection member 600 (or adaptor) for use with the connector 500 described with reference to FIG. 19. The interconnection member 600 is employed for connecting the ferrule 110 (and the optical fibre 320 therein) to a mating ferrule (and an end of an optical fibre arranged therein). The interconnection member 600 comprises a body 610, an opening 620 in the body 610 for receiving the connector 500 (or for receiving the housing of the connector 500), a sealing element 630 for sealing the opening 620 of the interconnection member 600 around the connector 500 (or around the housing of the connector 500), and a passage 640 in the opening 620 of the interconnection member 600 for receiving the ferrule 110.

In the present embodiment, the passage 640 is a ceramic sleeve 640 provided with a ferrule guide 650 at the entrance of the passage 640 for guiding the ferrule 110 during insertion. The sealing element 630 is provided in the form of a rubber ring 630.

The interconnection member 600 has a similar opening 620' on the opposite side for receiving another connector 500, such that the ferrules 110 (and the optical fibres within the ferrules 110) of the respective connectors 500 meet in the passage 640. The connectors 500 may simply be pushed into the respective openings 620 and 620'.

Figure 21:
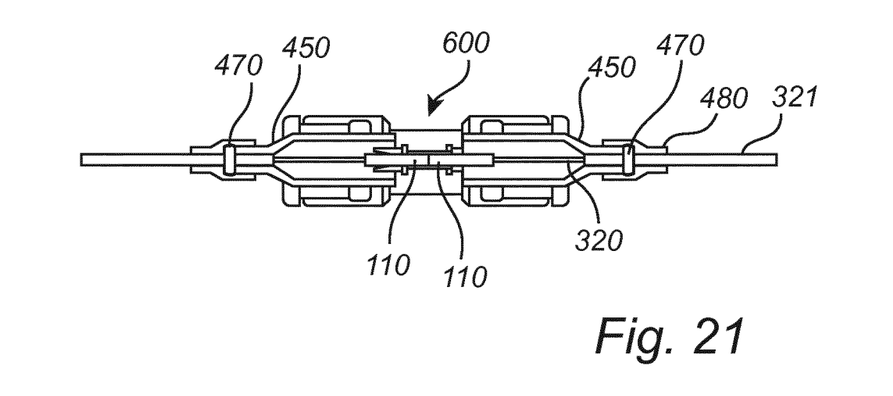
FIG. 21 illustrates use of the interconnection member from FIG. 20 for connecting two connectors of the type shown in FIG. 19.

FIG. 21 illustrates use of the interconnection member 600 described with reference to FIG. 20 for connecting two connectors 500 of the type described with reference to FIG. 19. It will be appreciated that, in order to improve clarity in FIG. 21, some of the components (e.g. ferrule back body 120 and back body holder 140) of the connectors 500 are not show therein.

In order to make the connectors 500 water resistant (and therefore suitable for outdoor use), sealing elements 470 have been arranged to seal the passage 451 of the rear connector housing 450 around the optical fibre 320 or around a protective coating 321 enclosing the fibre 320. As is well-known to the person skilled in the art, an optical fibre 320 may be provided in a cable comprising several layers enclosing the centrally arranged optical fibre 320. For example, a 125 um diameter fibre 320 may be covered by a 250 um primary coating, a 900 um tight buffer, and a cable jacket, such that the cable has a diameter of 2-3 mm. The sealing elements 470 may for example be rubber rings 470 held in place by crimps 480 or clamps.

The sealing elements 630 of the interconnection member 600 and the sealing elements 470 of the connectors 500 allow the interconnection member 600 and the connectors 500 to form a water resistant connection suitable for outdoor use. Such a connection may for example comply with an environmental sealing rating (or IP rating). In other words, due to the environmental seal provided by the interconnection member 600 and the connectors 500, there may be no need for additional sealing layers (which may be costly and/or which may take up a lot of space) for protecting the interior of the connectors 500 and the optical fibres 320 from environmental conditions experienced outdoors.

In addition to preventing water to enter the connector 500, the sealing element 470 restrains the cable 321 to protect the ferrule 110 from being affected if the cable 321 is pulled.

As described above, the connector 500 allows the ferrule 110 to piston back and forth. As the sealing element 470 restrains the cable 321 from moving, the fibre 320 flexes (or bends) somewhat inside the connector 500 when the ferrule 110 pistons.

The person skilled in the art realizes that the present invention is by no means limited to the preferred embodiments described above. On the contrary, many modifications and variations are possible within the scope of the appended claims. For example, although only a few example connectors have been described in detail above, it will be appreciated that connectors having other external shapes than those described above may also be assembled using assemblies and methods according to at least some embodiments. The ferrule 110 may for example have a width W1 of 2.5 mm instead of 1.25 mm, and the connector obtained via the method 200 may for example be larger than a regular LC connector. It will also be appreciated that connectors and assemblies according to at least some embodiments may for example comprise multiple ferrules for accommodating multiple optical fibres.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method comprising:
providing a ferrule assembly mounted at an end of an optical fibre, the ferrule assembly comprising a ferrule and a ferrule back body, wherein the ferrule is mounted in an opening of the ferrule back body, wherein the optical fibre extends through the ferrule along an axial direction of the ferrule assembly, and wherein the ferrule back body has a guide element;
passing the ferrule assembly through a tubular section such that a portion of the optical fibre ends up in the tubular section;
passing the ferrule assembly through a passage of a biasing member, while maintaining a portion of the optical fibre inside the tubular section, until at least a portion of the ferrule back body protrudes out of the passage at a far side of the biasing member;
inserting the at least a protruding portion of the ferrule back body into an opening of a ferrule back body holder, wherein the insertion comprises:
moving the ferrule assembly relative to the ferrule back body holder in the axial direction until at least a portion of the ferrule back body is located in the opening of the ferrule back body holder; and
maintaining, during the relative movement in the axial direction, an orientation of the ferrule back body relative to the ferrule back body holder determined by the guide element; and
attaching the ferrule back body holder to the at least a portion of the ferrule back body located in the opening of the ferrule back body holder, the ferrule back body holder thereby preventing the ferrule assembly from passing back through the passage of the biasing member.

2. The method of claim 1, wherein attaching the ferrule back body holder to the at least a portion of the ferrule back body located in the opening of the ferrule back body holder comprises:
inserting the at least a protruding portion of the ferrule back body a certain distance into the opening of the ferrule back body holder such that a fastening element snaps into place.

3. The method of claim 1, further comprising, prior to passing the ferrule assembly through the passage of the biasing member:
passing the ferrule assembly through a passage of a first housing member, while maintaining a portion of the optical fibre inside the tubular section, until at least a portion of the ferrule back body protrudes out of the passage of the first housing member at a far side of the first housing member.

4. The method of claim 3, further comprising, after attaching the ferrule back body holder:
attaching a second housing member to the first housing member to form a housing enclosing the biasing member, the ferrule back body and the ferrule back body holder, the second housing member having an opening for allowing contact between the optical fibre and another optical fibre.

5. An assembly comprising:
a ferrule having an opening extending through the ferrule for accommodating an end portion of an optical fibre;
a ferrule back body having an opening for insertion of the ferrule along an axial direction, wherein the ferrule back body has a guide element;
a biasing member having a passage sized to allow the ferrule and the ferrule back body to pass through the biasing member; and
a ferrule back body holder having an opening adapted to receive at least a portion of the ferrule back body via movement of the ferrule back body relative to the ferrule back body holder in the axial direction,
wherein the opening of the ferrule back body holder is shaped to engage with the guide element for maintaining a certain orientation of the ferrule back body relative to the ferrule back body holder, wherein the ferrule back body holder has a fastening element for attaching the ferrule back body holder to the at least a portion of the ferrule back body, and wherein said passage is sized to prevent the ferrule back body from passing through said passage when attached to the ferrule back body holder.

6. The assembly of claim 5, wherein the guide element extends in the axial direction along an exterior surface of the ferrule holder.

7. The assembly of claim 5, wherein the guide element is a recess.

8. The assembly of claim 5, wherein the ferrule holder has a recess with which the fastening element of the ferrule back body holder is adapted to engage.

9. The assembly of claim 8, wherein the recess of the ferrule back body is an annular recess.

10. The assembly of claim 5, wherein the ferrule is mounted in the opening of the ferrule back body, the assembly comprising:
an end portion of an optical fibre accommodated in the opening of the ferrule, wherein an end face of the optical fibre has been polished at an angle.

11. The assembly of claim 5, further comprising:
a first housing member having a passage sized to allow the ferrule and the ferrule back body to pass through the first housing member, wherein the passage of the first housing member is sized to prevent the biasing member from passing through the passage of the first housing member.

12. The assembly of claim 11, further comprising:
a second housing member, wherein the first and second housing members are shaped to match each other so as to form a housing when attached to each other.

13. The assembly of claim 12, wherein the first and second housing members are shaped such that the housing has the same exterior shape as the housing of an LC connector or an MU connector.

14. The assembly of claim 12, further comprising:
a sealing element for sealing the passage of the first housing member around the optical fibre, or around a protective coating enclosing the optical fibre.

15. The assembly of claim 12, wherein the second housing member has an opening for allowing the ferrule to extend out of said housing, the assembly further comprising:
an interconnection member for connecting the optical fibre to another optical fibre, the interconnection member comprising:
an opening for receiving the housing;
a sealing element for sealing the opening of the interconnection member around the housing; and
a passage in the opening of the interconnection member for receiving the ferrule.

16. A connector obtained by the method of claim 4, the connector comprising:
the ferrule;
the ferrule back body;
the biasing member;
the ferrule back body holder;
the first housing member; and
the second housing member.

17. The method of claim 2, further comprising, prior to passing the ferrule assembly through the passage of the biasing member:
passing the ferrule assembly through a passage of a first housing member, while maintaining a portion of the optical fibre inside the tubular section, until at least a portion of the ferrule back body protrudes out of the passage of the first housing member at a far side of the first housing member.

18. The assembly of claim 6, wherein the guide element is a recess.

19. The assembly of claim 6, wherein the ferrule holder has a recess with which the fastening element of the ferrule back body holder is adapted to engage.

20. The assembly of claim 6, further comprising:
a first housing member having a passage sized to allow the ferrule and the ferrule back body to pass through the first housing member, wherein the passage of the first housing member is sized to prevent the biasing member from passing through the passage of the first housing member.

21. The method of claim 1, wherein
the guide element of the ferrule back body is a first guide element,
the ferrule back body holder includes a second guide element, and
the maintaining of the orientation of the ferrule back body relative to the ferrule back body holder is determined by the first guide element and the second guide element.

22. The assembly of claim 5, wherein
the guide element of the ferrule back body is a first guide element,
the ferrule back body holder includes a second guide element, and
the maintaining of the orientation of the ferrule back body relative to the ferrule back body holder is determined by the first guide element and the second guide element.

* * * * *